United States Patent [19]

Pagani

[11] Patent Number: 4,819,685
[45] Date of Patent: Apr. 11, 1989

[54] TUBELESS TIRE VALVE

[75] Inventor: Ezio Pagani, Bergamo, Italy

[73] Assignee: Bridge Products, Inc., Northbrook, Ill.

[21] Appl. No.: 184,267

[22] Filed: Apr. 21, 1988

Related U.S. Application Data

[60] Division of Ser. No. 885,377, Jul. 14, 1986, Pat. No. 4,739,813, which is a continuation of Ser. No. 601,223, Apr. 17, 1984, abandoned.

[51] Int. Cl.$^4$ .............................................. B60C 23/10
[52] U.S. Cl. .................................... 137/223; 137/231; 152/427; 152/DIG. 11
[58] Field of Search ...................... 137/223, 232, 234.5, 137/231; 152/427, 430, DIG. 11

[56] References Cited

U.S. PATENT DOCUMENTS

| | | | |
|---|---|---|---|
| 1,313,554 | 8/1919 | Nielsen | 137/233 |
| 2,033,512 | 3/1936 | Carliss | 137/234.5 |
| 2,106,671 | 1/1938 | Watson | 137/232 |
| 2,240,129 | 4/1941 | Broecker | 137/223 |
| 2,255,932 | 9/1941 | Kraft et al. | 152/430 |
| 2,269,367 | 12/1941 | Gora | 152/149 |
| 2,272,548 | 1/1941 | Creamer | 277/20 |
| 2,272,634 | 5/1941 | Bronson | 277/42 |
| 2,276,502 | 5/1941 | McCoy | 277/42 |
| 2,844,183 | 7/1958 | McCord | 152/DIG. 11 |
| 2,862,515 | 12/1958 | Briechle | 137/234.5 |
| 2,966,191 | 12/1960 | Williams | 152/427 |
| 2,968,333 | 1/1961 | Ayres | 152/427 |
| 3,033,263 | 5/1962 | Greco | 152/427 |
| 3,207,172 | 9/1965 | Steer | 137/234.5 |
| 3,396,743 | 8/1968 | Mackal et al. | 137/223 |
| 3,429,330 | 2/1969 | Bogossian et al. | 137/223 |
| 3,489,166 | 1/1970 | Williams | 137/234.5 |
| 3,712,326 | 1/1973 | Thacker | 137/223 |
| 3,741,267 | 6/1973 | Thacker | 152/427 |
| 3,967,639 | 7/1976 | Mottram | 137/234.5 |
| 4,046,163 | 9/1977 | Novak | 137/512.3 |
| 4,064,923 | 12/1977 | German et al. | 152/427 |
| 4,077,456 | 3/1978 | Smith | 152/427 |
| 4,097,075 | 6/1978 | Clayton | 137/234.5 X |
| 4,171,119 | 10/1979 | Lamson | 137/223 X |
| 4,275,756 | 6/1981 | Cairns | 137/234.5 |
| 4,294,301 | 10/1981 | Lutz | 152/427 |
| 4,340,080 | 7/1982 | Lefrancois | 137/223 |
| 4,425,578 | 10/1984 | Nidle | 152/427 X |
| 4,506,695 | 3/1985 | Kuypers | 137/223 |
| 4,538,658 | 9/1985 | Earley | 137/234.5 X |

FOREIGN PATENT DOCUMENTS

| | | | |
|---|---|---|---|
| 206271 | 6/1956 | Australia | 137/234.5 |
| 672880 | 3/1966 | Belgium . | |
| 1082580 | 7/1980 | Canada . | |
| 800108 | 9/1950 | Fed. Rep. of Germany | 137/234.5 |
| 802791 | 2/1951 | Fed. Rep. of Germany . | |
| 1020885 | 1/1957 | Fed. Rep. of Germany . | |
| 1871095 | 4/1963 | Fed. Rep. of Germany . | |
| 2205257 | 6/1973 | Fed. Rep. of Germany | 137/234.5 |
| 2639571 | 3/1977 | Fed. Rep. of Germany . | |
| 2303646 | 8/1978 | Fed. Rep. of Germany . | |
| 1576079 | 7/1969 | France . | |
| 2280003 | 3/1974 | France . | |
| 2383374 | 3/1977 | France . | |
| 2385548 | 3/1977 | France . | |
| 2340493 | 9/1977 | France . | |
| 2406531 | 10/1977 | France . | |
| 2417044 | 2/1978 | France . | |
| 180694 | 4/1962 | Sweden | 137/223 |
| 1339756 | 12/1973 | United Kingdom | 137/223 |
| 1376351 | 12/1974 | United Kingdom | 137/223 |
| 1044423 | 9/1986 | United Kingdom . | |

Primary Examiner—John Rivell
Attorney, Agent, or Firm—Willian Brinks Olds Hofer Gilson & Lione Ltd.

[57] ABSTRACT

A tubeless tire valve has a one piece, integral valve body having a central passageway formed therein, wherein the passageway is formed of upper, central and lower regions. A one piece, integral valve pin has a head sized to fit in the upper region, a first shank extending away from the head to an enlargement, and a second shank extending away from the enlargement. The pin enlargement has a maximum dimension larger than the central region to create an interference fit therewith, and the maximum dimension is selected such that the enlargement can be forced through the central region. A resilient internal gasket is mounted on the second shank to seal the central passageway.

4 Claims, 3 Drawing Sheets

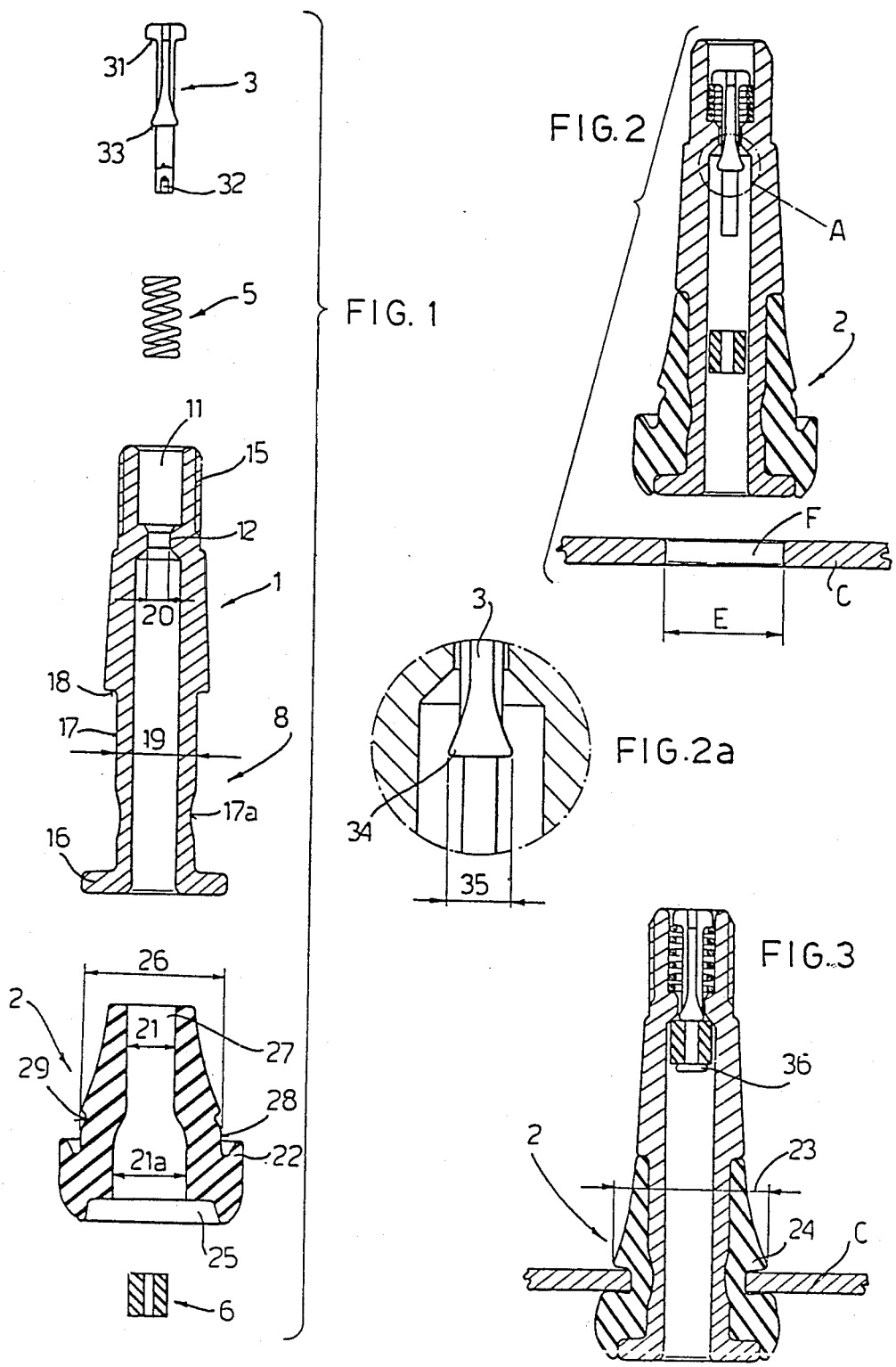

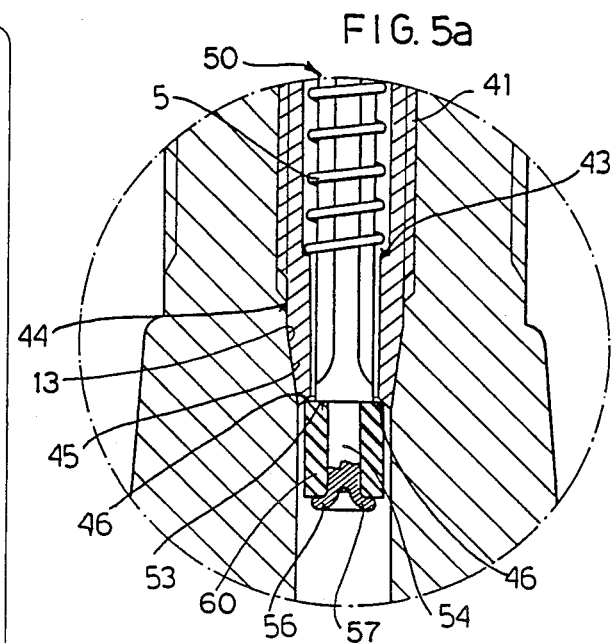
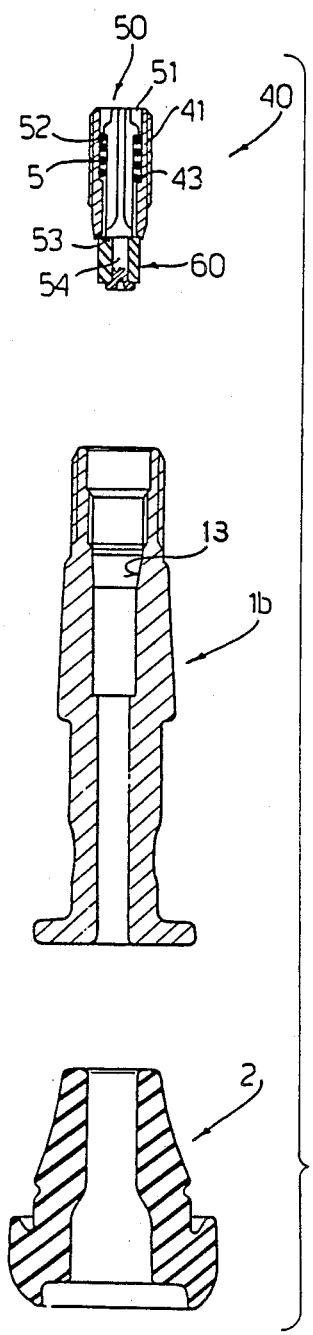
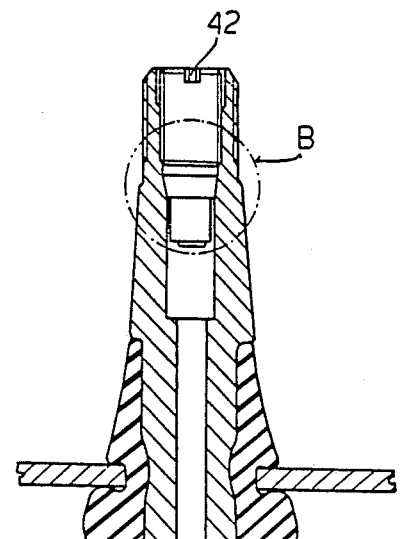
FIG. 4
FIG. 5

TUBELESS TIRE VALVE

This is a division of application Ser. No. 885,377, filed July 14, 1986, now U.S. Pat. No. 4,739,813, which is in turn a continuation of application Ser. No. 601,223, filed Apr. 17, 1984, now abandoned.

This invention relates to a valve provided with an external annular gasket which is employed as a sealing member between the rim and valve body in wheels using tires without tubes, normally referred to as "tubeless".

It is an object of the present invention to provide a valve with its seals, which is highly reliable, very economical and capable of simultaneously allowing a perfect or tight sealing between the rim and valve at any pressure that a tire may be subject to during road transport.

The above mentioned object has been achieved by providing on the valve body an external annular gasket which, when not mounted, has a diameter of the internal through hole partially lower than the diameter of the cylindrical portion of the valve body housing, on which it will be inserted, and partially larger than the latter at the coupling area with the rim, while said gasket externally has at one end an extended lip directed towards the rim, then an intermediate zone having a larger diameter than that of the hole in said rim, and close to said intermediate zone an annular groove of reduced diameter, while a hollowed impression is provided on the valve body at the zone where the rim will be positioned.

This valve may be used together with a mechanism of a conventional type for valve opening and closing, or together with further simplified mechanisms.

One embodiment provides a valve mechanism comprising a pin, a spring and an internal sealing gasket, said pin being provided at one end thereof with a support for the spring and at the other end with a cavity for accomodating said internal sealing gasket of the valve, and in the hole of the valve body a narrowing being provided, so that it can perform the function of both a second support for the spring and a closure seat for the valve cooperating with the internal sealing gasket mounted on said pin.

A further improvement provides that said pin has an enlarged zone with a larger diameter than the narrowing diameter, so that when inserted in the valve body said pin cannot exit therefrom.

Another embodiment provides a valve mechanism comprising three elements: an externally threaded small tube and a pin, both of which are made of plastic material, and a gasket mounted on said pin and disposed to provide the sealing between the pin and a small tube, said small tube being provided at one end thereof with a first tapered portion having such a tapering as to accommodate the tapering of the valve body in which it is to be inserted, and a second tapered portion, furthermost than the former, which has a different tapering than the first tapered portion, such as to interfer with the tapered portion of the valve body whereby the second tapered portion will by deforming during screwing down adhere to the tapered portion of the valve body and seal therewith.

Preferably, this embodiment provides that said end of the small tube carrying on its external surface the above described dual tapering is fitted on its internal portion with a further tapered portion which is used as a seat for the gasket carried by the pin.

Preferably, the pin is made in this case by a spider having a "Y" shape in cross-section.

The plastic for providing both said small tube and pin above described is preferably selected of the type having self-lubricating features.

Finally, the valve may or may not comprise a return spring which prevents ambient air from entering the tube when vacuum has been provided in the latter for control and/or packaging reasons.

This invention will now be further described with reference to some exemplary embodiments as shown in the accompanying drawings, in which:

FIG. 1 is an exploded view of a first embodiment;

FIG. 2 is a view showing the valve of FIG. 1 as partially mounted;

FIG. 2a is a view showing the enlarged detail A of FIG. 2;

FIG. 3 is a view of the valve of FIG. 1 when completely mounted and at closed position;

FIG. 4 is an exploded view showing another embodiment of the valve mechanism;

FIG. 5 is a view of the completely mounted embodiment of FIG. 4;

FIG. 5a is a view showing the enlarged detail B of FIG. 5;

Figures 6, 7, 7A:
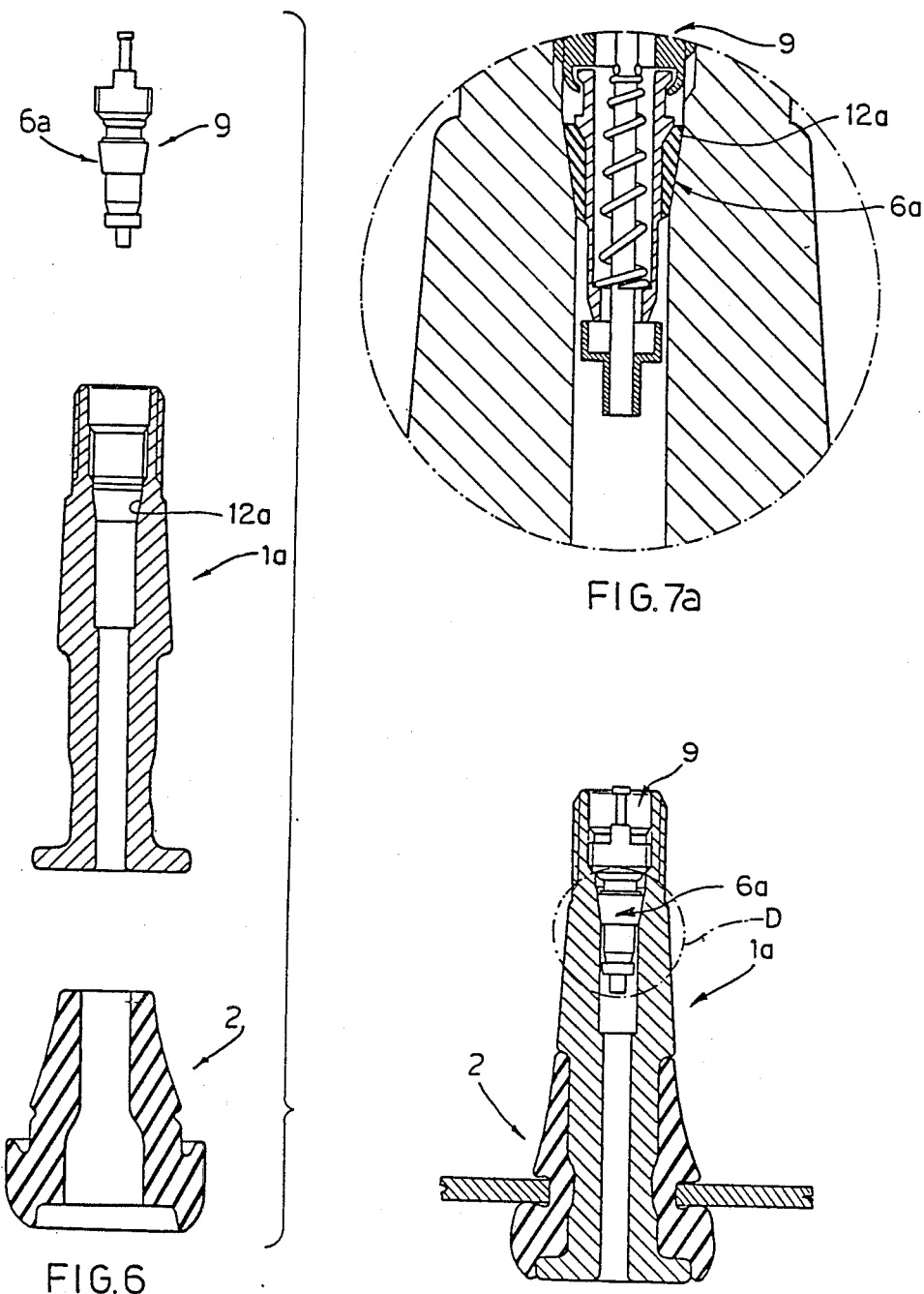
FIG. 6 is an exploded view of a further embodiment.
FIG. 7 is a view of the valve of FIG. 6 as mounted.
FIG. 7a is an enlarged view of the detail D of FIG. 7.

Referring first to FIGS. 1 to 3, it will be seen that reference numeral 2 generally denotes an external gasket with a hole 27 having partly a lower diameter 21 than the diameter 19 of the cylindrical portion 17 of valve body 1 on which said gasket 2 will be inserted. Another portion of said hole 27 has a larger diameter 21a than the diameter 19 of the portion 17 of the valve body 1.

Preferably, said gasket 2 has, at the end which will be inside of the tire, a cavity 25 into which the head 16 of the valve body 1 will penetrate.

Externally, said gasket has at an intermediate zone thereof an external cylindrical portion 28 having a height nearly corresponding to the thickness of the rim C. The diameter 26 of this cylindrical portion 28 is larger than the diameter E of the hole F in said rim C.

Adjacent to the cylindrical portion 28 and at that side which will be positioned within the tire, a lip 22 is provided directed towards said rim C, so as to create a better adherence therewith.

Close to its external limit, said cylindrical portion 28 is provided with a groove 29. When the gasket is mounted within the hole F of said rim C, the latter by narrowing the cylindrical portion 28 causes a bulging which provides a second lip 24 (FIG. 3) having such a diameter 23 as to retain said gasket 2 in position when inserted in the rim C.

The valve body 1 has an interior comprising a through hole 11, at an intermediate location of which a narrowing 12 is provided. The outside part of said body, nose or outer side, is conventional, that is it has a threading 15 for receiving a normal cap. The valve head 16, which is provided at the other end of said body 1, will be placed inside of the rim C and will be of a larger size than said hole F. Together with an abutment 18 provided on the external surface of said body 1 and cylindrical portion 17 therebetween, said head 16 provides a housing 8, in which said external gasket 2 is firmly anchored, preventing the tire pressure from ejecting said valve from the hole F of said rim C. Within its cylindrical portion 17, said housing 8 has a hollowed impression 17a arranged at the position to be taken by the rim C.

The valve opening and closing mechanism has been simplified to maximum extent, and consists of only three components, that is the pin 3, the spring 5 and the internal annular gasket 6.

Said pin 3 is so shaped as to have at one end thereof a bearing 31 to act as a seat for said spring 5. At another end thereof, it is provided with an abutment 33 forming together with a hole 32 creating a rivet 36 a seat for receiving and retaining the internal gasket 6. Said pin 3 (FIG. 2a) has also an enlargement 34, which is shaped to have a maximum diameter 35 which is larger than the diameter 20 of the narrowing 12 provided in said valve body 1.

This valve can be assembled as follows:

(1) The external gasket 2 is placed in the housing 8 of the valve body 1 by a nose (not shown) facilitating the gasket sliding into the threaded area 15 of the valve.

(2) The spring 5 is inserted in the hole 11 of the threaded end 15 (nose zone), whereupon said pin 3 is inserted in the spring 5 exerting a slight pressure, which is required in order to overcome the resistance due to the interference existing between the minimum diameter 20 of the narrowing 12 and the diameter 35 of the enlargement 34 forming the collar of said abutment 33.

(3) At the other end of the valve body 1 (head side), the internal gasket 6, which will be secured by the rivet 36, is inserted on said pin 3.

(4) Now the valve can be subjected to sealing test, etc. and to (optional) assembling of the cap which, in addition to ensuring an additional air sealing, has a protective function against weather agent, dust, etc.

The valve is readily and easily mounted in the rim by the usual methods used for "snap-in" type of valves, since it lacks a threaded ring nut (conversely to the "clamp-in" valves). It is not rigidly blocked on the rim, but by bending has the capability of absorbing impacts without being damaged.

Preferably, said body 1 is made of resin, but it may also be made of brass or aluminum.

Alternately, the interior of valve 1a can be machined so as to accomodate a conventional mechanism 9 (FIGS. 6, 7 and 7a). In this case, the valve body 1a internally has a conical portion 12a which is such as to receive the also conical internal gasket 6a.

Another embodiment has been shown in FIGS. 4, 5 and 5a. In this case, the valve mechanism comprises a small tube 40, a pin 50 and a gasket 60. The small tube 40 is provided with an external thread 41 extending from one end to a major portion of the whole external surface thereof. This end also has a milling 42 which serves for introducing said small tube 40 into the valve body 1b. Said small tube 40 also has an internal abutment 43 acting as a seat for the head 51 of said pin 50 or spring 5. Adjacent to the end opposite to that carrying said milling 42, the small tube 40 has a first external tapered portion 44 having such a tapering as to accomodate the tapering provided inside of the valve body 1b, as discussed in the following. Adjacent and furthermost with respect to the first tapered portion 44 a second tapered portion 45 is provided, which is of a different tapering to the former and such as to interfere with the tapering 13 of the valve body 1b when said small tube 40 is screwed down within the valve body 1b. The end of the small tube 40 externally carrying the two tapered portions 44 and 45 is internally provided with a further tapered portion 46, serving as a seat for the gasket 60.

The pin 50 is provided with a head 51 forming an abutment 52, which will serve as a seat for the spring 5. Said pin has an elongate body which is of "Y" shape in cross-section. This shape is such as to cause said pin to perfectly uniformly and smoothly slide within the small tube 40. At the opposite end to that carrying the head 51, said pin 50 is provided with a seat for the gasket 60, comprising an abutment 53 and a projection 54 terminating with a hole 57 enabling said gasket to be secured by riveting, obtained by locally deforming said projection 54 to provide the rivet 56.

What I claim is:

1. A tire valve comprising:
   a one-piece, integral valve body having a central passageway formed therein, said passageway defining an upper region, a central region and a lower region, said central region being smaller in cross-sectional dimension than the upper and lower regions and bounded by an upwardly facing upper shoulder and a downwardly facing lower shoulder;
   a one-piece, integral valve pin having a head sized to fit within the upper region, a first shank extending away from the head to an enlargement, and a second shank extending away from the enlargement, said first shank sized to slide in the central region, said enlargement having a maximum dimension larger than the central region to create an interference fit therewith, said maximum dimension selected such that the enlargement can be forced through the central region into the lower region of the central passageway; and
   a resilient internal gasket mounted over the second shank and sized to bear against the lower shoulder to seal the central passageway, said internal gasket adapted to be mounted on the second shank in the lower region after the second shank has been passed through the central region.

2. The invention of claim 1 further comprising:
   a coil spring positioned around the first shank to bear on the upper shoulder of the valve body and the head of the valve pin to bias the internal gasket into engagement with the lower shoulder.

3. The tire valve of claim 1 wherein the enlargement defines an upwardly tapering upper surface and a flat lower surface oriented transverse to the lower shank to bear aganst a corresponding oriented face of the internal gasket.

4. The invention of claim 1 wherein the head of the valve pin is sized too large to pass through the central region of the valve body.

* * * * *